(12) United States Patent
Youn

(10) Patent No.: US 7,247,109 B2
(45) Date of Patent: Jul. 24, 2007

(54) PULLEY FIXING APPARATUS OF IMAGE FORMING APPARATUS

(75) Inventor: Karp-sik Youn, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 212 days.

(21) Appl. No.: 10/670,262

(22) Filed: Sep. 26, 2003

(65) Prior Publication Data

US 2004/0087400 A1     May 6, 2004

(30) Foreign Application Priority Data

Nov. 6, 2002    (KR)    ............ 10-2002-0068490

(51) Int. Cl.
*F16H 7/08*    (2006.01)
(52) U.S. Cl. ..................... 474/109
(58) Field of Classification Search ............ 474/109, 474/114, 115, 117; 347/37–39, 54, 86, 91; 403/13, 14, 283, 278
See application file for complete search history.

(56) References Cited

U.S. PATENT DOCUMENTS

| | | | | |
|---|---|---|---|---|
| 3,413,866 A | * | 12/1968 | Ford | ............ 474/138 |
| 4,969,859 A | * | 11/1990 | Holbrook | ............ 474/138 |
| 5,141,083 A | * | 8/1992 | Burgoon | ............ 188/73.1 |
| 5,964,542 A | * | 10/1999 | Ruhe et al. | ............ 400/352 |
| 6,485,207 B1 | * | 11/2002 | Allen et al. | ............ 400/335 |
| 6,485,383 B1 | * | 11/2002 | Hendricks et al. | ............ 474/101 |
| 6,743,132 B2 | * | 6/2004 | Serkh | ............ 474/136 |

FOREIGN PATENT DOCUMENTS

JP        09240100 A    *   9/1997

* cited by examiner

*Primary Examiner*—Vicky A. Johnson
(74) *Attorney, Agent, or Firm*—Staas & Halsey LLP

(57) ABSTRACT

A pulley fixing apparatus of an office machine having a pulley fixing part rotatably fixing a driven pulley on a frame, a sliding part movably supporting the pulley fixing part on the frame, and an automatic tension adjusting part elastically urging the pulley fixing part in a direction such that the driven pulley imparts a predetermined tension to a power-transmitting belt. The pulley fixing apparatus readily enables mounting and dismounting of the power-transmitting belt and the driven pulley and control of the power-transmitting belt tension by simplifying structure and assembly. Further, the pulley fixing apparatus reduces manufacturing cost and assembly time by decreasing the number of parts.

23 Claims, 10 Drawing Sheets

PULLEY FIXING APPARATUS OF IMAGE FORMING APPARATUS

CROSS-REFERENCE TO RELATED APPLICATIONS

This application claims the benefit of Korean Application No. 2002-68490, filed Nov. 6, 2002, in the Korean Intellectual Property Office, the disclosure of which is incorporated herein by reference.

BACKGROUND OF THE INVENTION

1. Field of the Invention

The present invention relates to an image forming apparatus, and may be an inkjet printer, a facsimile machine, a laser printer, etc., and more particularly, to a pulley fixing apparatus of an image forming apparatus, which can easily mount and dismount a power-transmitting belt and a driven pulley, and easily control a tension of the power-transmitting belt.

2. Description of the Related Art

Generally, an image forming apparatus, for example an inkjet printer 1, has a carrier 20 mounting a print head 30 having a nozzle for jetting ink, a chassis 10 having side frames 12 and 12' to support a guide rail 11 and a carrier shaft 50 guiding the movement of the carrier 20, a carrier driving part 21 (FIG. 2) moving the carrier 20 right and left along the carrier shaft 50, and a feed roller driving part 61 driving a feed roller 60 to transport a sheet of paper to be printed, as shown in FIG. 1.

The carrier 20 is provided with a guide slider 29 formed at a rear side of an upper part thereof to be movable right and left coming in contact with a vertical wall 11' of the guide rail 11, and a supporting bracket 26 receiving the carrier shaft 50 and supported on the carrier shaft 50 to be movable right and left thereon.

As shown in FIG. 2, the carrier driving part 21 is composed of a carrier driving motor 28 fixed on a rear frame 15 of the chassis 10, and a carrier transfer belt 23 connected with a driving pulley 24 of the carrier driving motor 28. The carrier transfer belt 23 transmits a driving force of the carrier driving motor 28 to a power-transmitting saw tooth 25 formed at the rear side of the carrier 20 to move the carrier 20 right and left.

The feed roller driving part 61 has a feed roller driving motor 62 fixed at a lower part of the side frame 12, a power-transmitting pulley 66 connected to a driving pulley 63 of the feed roller driving motor 62 through a power-transmitting belt 65 and having a power-transmitting gear 67, and a feed roller driving gear 69 engaged with the power-transmitting gear 67.

The operation of the inkjet printer 1 constructed as above will be described.

When a printing command is issued from a computer or a controller, the feed roller driving motor 62 drives a pickup roller (not shown) connected to the feed roller driving gear 69 of the feed roller driving part 61 through a separate gear train (not shown) to pickup a sheet of paper from a paper cassette or tray (not shown) and transport it toward the feed roller 60.

After arriving at the feed roller 60, the sheet of paper is transported toward the print head 30 in a predetermined feed rate by the feed roller 60 connected with the feed roller driving gear 69 through the power-transmitting belt 65 transmitting the driving force of the feed roller driving motor 62, the power-transmitting pulley 66, and the power-transmitting gear 67.

Thereafter, when the sheet of paper passes below the print head 30, the print head 30 jets ink through the nozzle onto the sheet of paper, moving left and right along the guide rail 11 and the carrier shaft 50 by the carrier 20 which is moved left and right through the driving pulley 24 transmitting the driving force of the carrier driving motor 28, the carrier transfer belt 23, the power-transmitting saw tooth 25, et al.

Thus, to move the carrier 20 mounting the print head 30 thereon during printing, the conventional inkjet printer 1 uses the carrier transfer belt 23, which is connected to the driving pulley 24 of the carrier driving motor 28 to transmit the driving force of the carrier driving motor 28 to the power-transmitting saw tooth 25 of the carrier 20.

But to stably transmit the driving force of the carrier driving motor 28 from the driving pulley 24 to the power-transmitting saw tooth 25 of the carrier 20, the carrier transfer belt 23 should be maintained in a tensioned state.

To accomplish this, in the conventional inkjet printer 1, as shown in FIGS. 3 and 4, a pulley fixing apparatus 70 is installed at a driven pulley 78 on the opposite side of the driving pulley 24 to adjust a tension of the carrier transfer belt 23.

The pulley fixing apparatus 70 is provided with a pulley cap 71, a bracket 75, and an adjusting part 72, 80 moving the pulley cap 71 in a longitudinal direction of the carrier transfer belt 23. The pulley cap 71 has support holes 74 rotatably receiving a shaft 79 formed to protrude from both sides of the driven pulley 78. The bracket 75 is located at the rear frame 15 to movably support the pulley cap 71 by receiving guides 73 formed at upper and lower walls of the pulley cap 71 through guide holes 76.

The adjusting part 72, 80 is composed of a female screw 72 that protrudes from a vertical wall of the pulley cap 71, and a tension adjusting screw 80 combined with the female screw 72 through a threaded hole 77 on the bracket 75, and an E-shaped ring 83, an O-shaped ring 82, and a spring 81, which are disposed in the inside of the bracket 75.

The conventional pulley fixing apparatus 70 constructed as above can relatively easily control the tension of the carrier transfer belt 23, since it adjusts a distance between the driving pulley 24 and the driven pulley 78 by rotating the tension adjusting screw 80 combined with the female screw 72. But to install the carrier transfer belt 23 and the driven pulley 78, complicated and troublesome assembling operations are required to combine the driven pulley 78 with the pulley cap 71, and then fix the pulley cap 71 to the bracket 75 by the tension adjusting screw 80.

Also, since the conventional pulley fixing apparatus 70 uses a large number of parts, manufacturing cost is increased.

SUMMARY OF THE INVENTION

It is an aspect of the present invention to provide an improved pulley fixing apparatus of an image forming apparatus, which can easily mount and dismount a power-transmitting belt and a driven pulley, and easily control a tension of the power-transmitting belt, by simplifying structure and assembling.

It is another aspect to provide the improved pulley fixing apparatus of the image forming apparatus, which can reduce manufacturing cost and assembly time by decreasing the number of parts.

According to one aspect, a pulley fixing apparatus has a power-transmitting belt transmitting a driving force, a driving motor having a driving pulley disposed at a first side of the power transmitting belt to transmit the driving force thereto, a driven pulley disposed at a second side of the power transmitting belt, a frame rotatably fixing the driving pulley of the driving motor and the driven pulley, a pulley fixing part rotatably fixing the driven pulley on the frame, a sliding part movably supporting the pulley fixing part on the frame, and an automatic tension adjusting part disposed between the pulley fixing part and the frame to elastically urge the pulley fixing part in a direction such that the driven pulley imparts a predetermined tension to the power transmitting belt.

According to one aspect, the pulley fixing part has an elongated plate member having a driven pulley support supporting the driven pulley such that a circumference surface of the driven pulley that contacts the second side of the power-transmitting belt is exposed, thereby allowing the power-transmitting belt to be freely installed on the driven pulley and removed from the driven pulley. According to one aspect, the driven pulley support has a flattened U-shaped bracket structure having a closed support hole at one end thereof to support one end of a center shaft of the driven pulley, and an opened support hole at an other end thereof to support an other end of the center shaft of the driven pulley, so that the driven pulley is easily installed thereto.

According to one aspect, the sliding part has at least one slide protrusion positioned at the pulley fixing part, and at least one protrusion guide hole positioned in the direction in which the pulley fixing part is elastically urged, to receive and guide the slide protrusion. According to one aspect, the protrusion guide hole has a length such that the pulley fixing part is movable when the power-transmitting belt is not installed, between a spring assembling position, in which the driven pulley is positioned beyond a length range of the power transmitting belt, and an initial pulley fixing part-assembling position, in which the driven pulley is positioned within the length range of the power transmitting belt.

According to one aspect, the slide protrusion has an L-shaped projection having a sliding end formed parallel with a surface of the frame, and a support portion formed perpendicular to the surface of the frame, and the protrusion guide hole is L-shaped, and has a wide hole portion receiving the sliding end, and a I-shaped hole portion receiving and guiding the support portion.

According to one aspect, the slide protrusion has a stopper preventing the sliding end from freely passing through the wide hole portion after the sliding part is movably supported on the frame, to allow the pulley fixing part to be temporarily stopped at a power transmitting belt-assembling position where the power-transmitting belt is installed. According to one aspect, the stopper has an L-shaped recess positioned at the sliding end to engage with a sidewall of the wide hole portion and a rear surface of the frame in the vicinity of the sidewall of the wide hole portion.

According to one aspect, the automatic tension adjusting part has an elastic spring having one end fixed at the pulley fixing part by a first fixing portion and an other end fixed at the frame by a second fixing portion, to urge the pulley fixing part in the direction in which the driven pulley imparts the predetermined tension to the power transmitting belt. According to one aspect, the first fixing portion has a first hook positioned at the one end of the elastic spring, and a first fixing protrusion positioned at the pulley fixing part to fix the first hook, and the second fixing portion has a second hook positioned at the other end of the elastic spring, and a second fixing protrusion to fix the second hook, positioned at the frame to protrude through a penetrated hole positioned at the pulley fixing part.

According to a further aspect, the automatic tension adjusting part has an anti-release portion to prevent the pulley fixing part from being released from the frame by an external force of predetermined magnitude. According to one aspect,, the anti-release portion is the second hook which has a width larger than that of the penetrated hole formed at the pulley fixing part.

According to one aspect, pulley fixing apparatus of the invention additionally has a locking part to lock the pulley fixing part after the tension of the power-transmitting belt installed on the driven pulley is adjusted. According to one aspect, the locking part has an elongated adjusting-guide hole with a long axis oriented at the pulley fixing part along the direction in which the pulley fixing part is elastically urged, a threaded hole positioned at the frame to correspond to the elongated adjusting-guide hole, and a locking screw engaging the threaded hole through the elongated adjusting-guide hole.

According to one aspect, the locking part additionally has an anti-push portion to prevent the pulley fixing part from being pushed by the driving force of the power-transmitting belt. According to one aspect, anti-push portion has at least one projection positioned at the frame in the vicinity of the threaded hole. According to one aspect, projection is a protrusion portion positioned by press machining to protrude toward the pulley fixing part. According to another aspect, the projection is a burr positioned around a hole formed by press machining to protrude toward the fixing pulley part.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION

Figure 1:
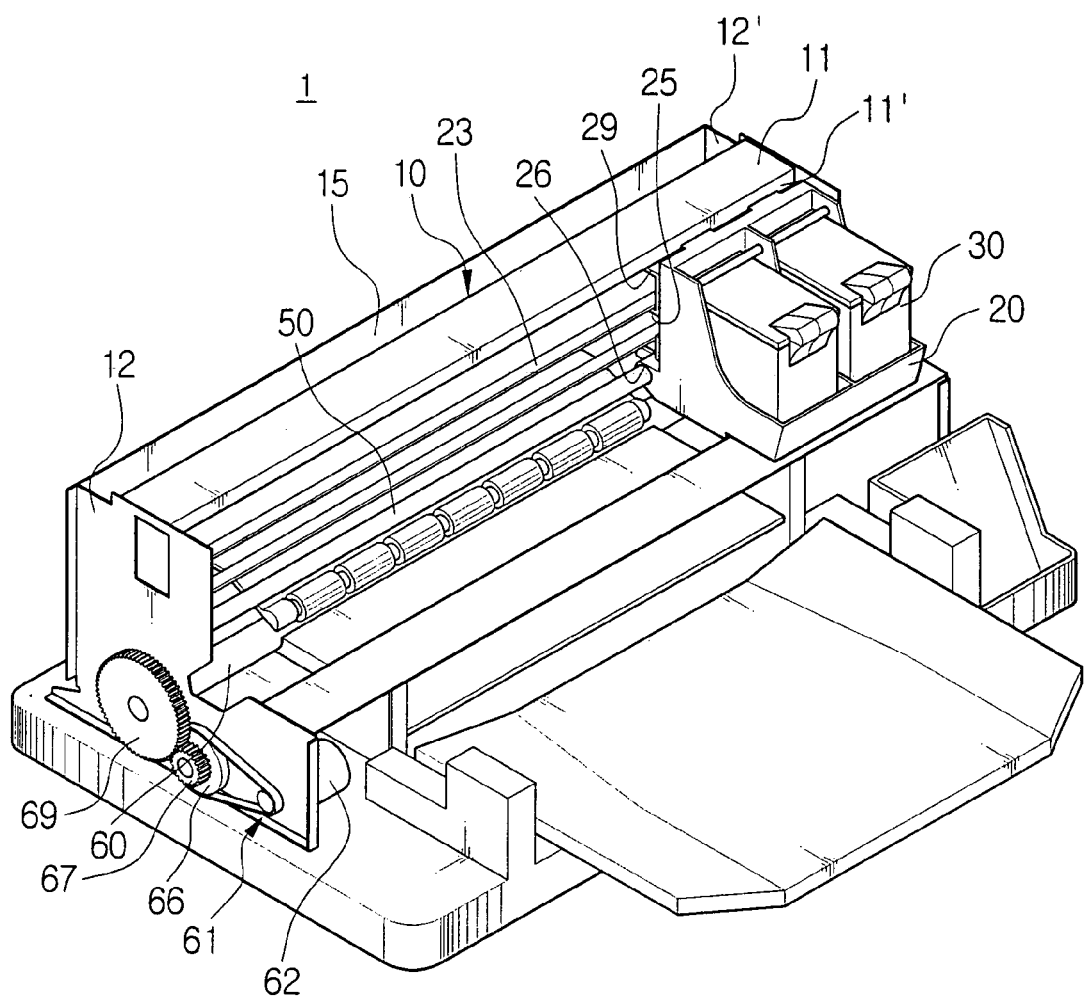
FIG. 1 is a partial perspective view of a conventional inkjet printer.
Figure 2:
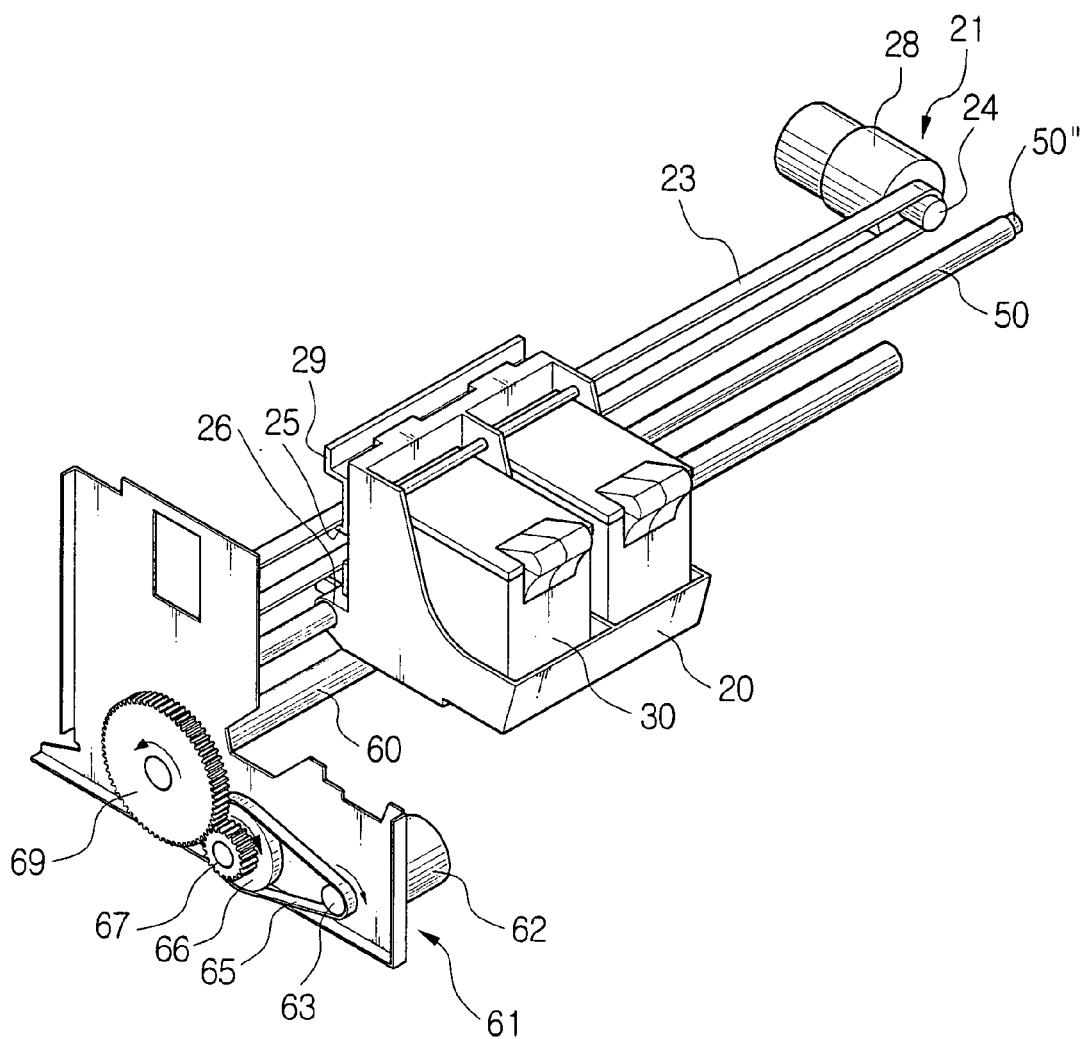
FIG. 2 is a schematic perspective view of a driving apparatus of the inkjet printer FIG. 1.
Figure 3:
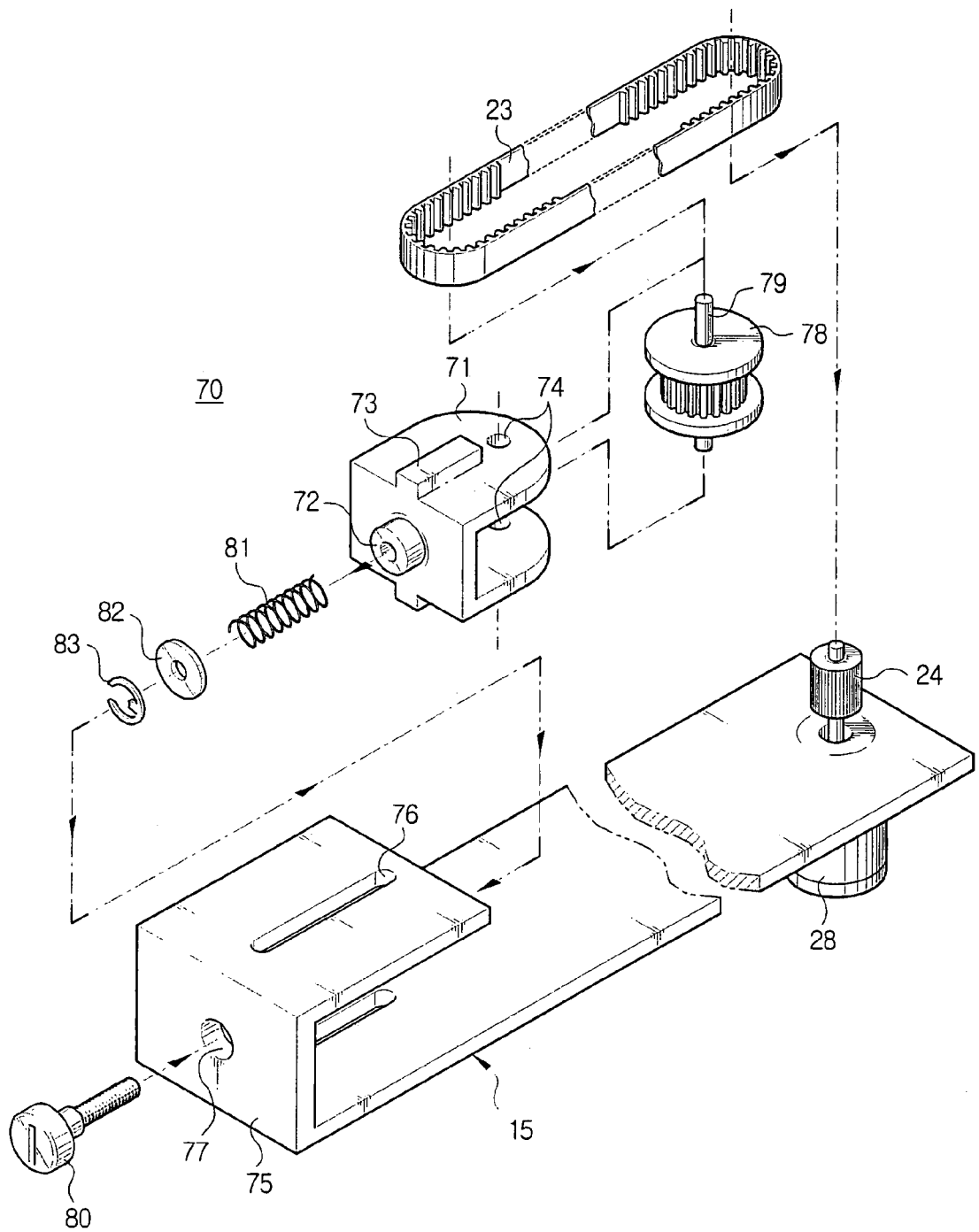
FIG. 3 is an exploded view of a pulley fixing apparatus of the inkjet printer of FIG. 1.
Figure 4:
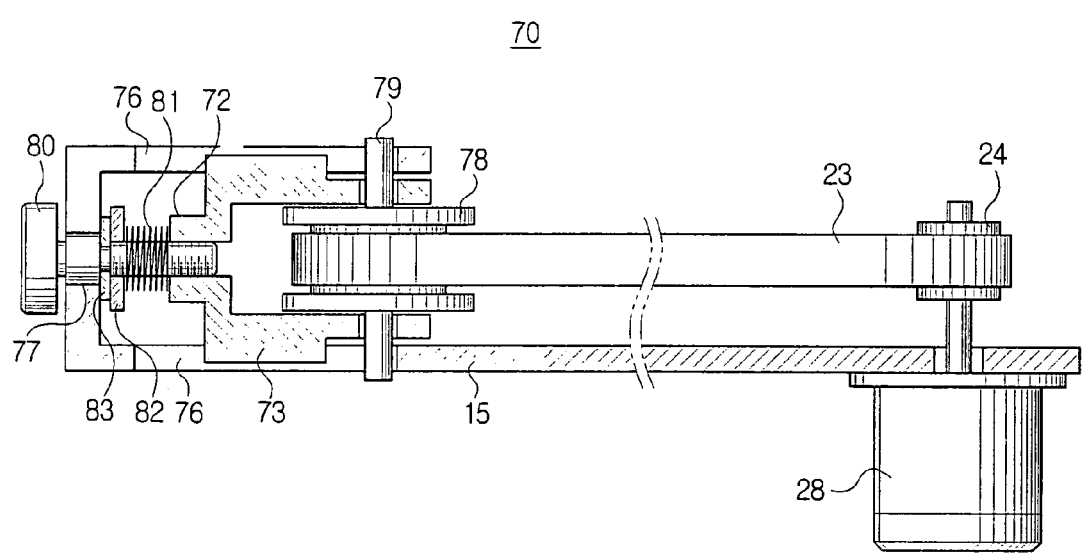
FIG. 4 is a cross-sectional view of the pulley fixing apparatus of FIG. 3.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 5:
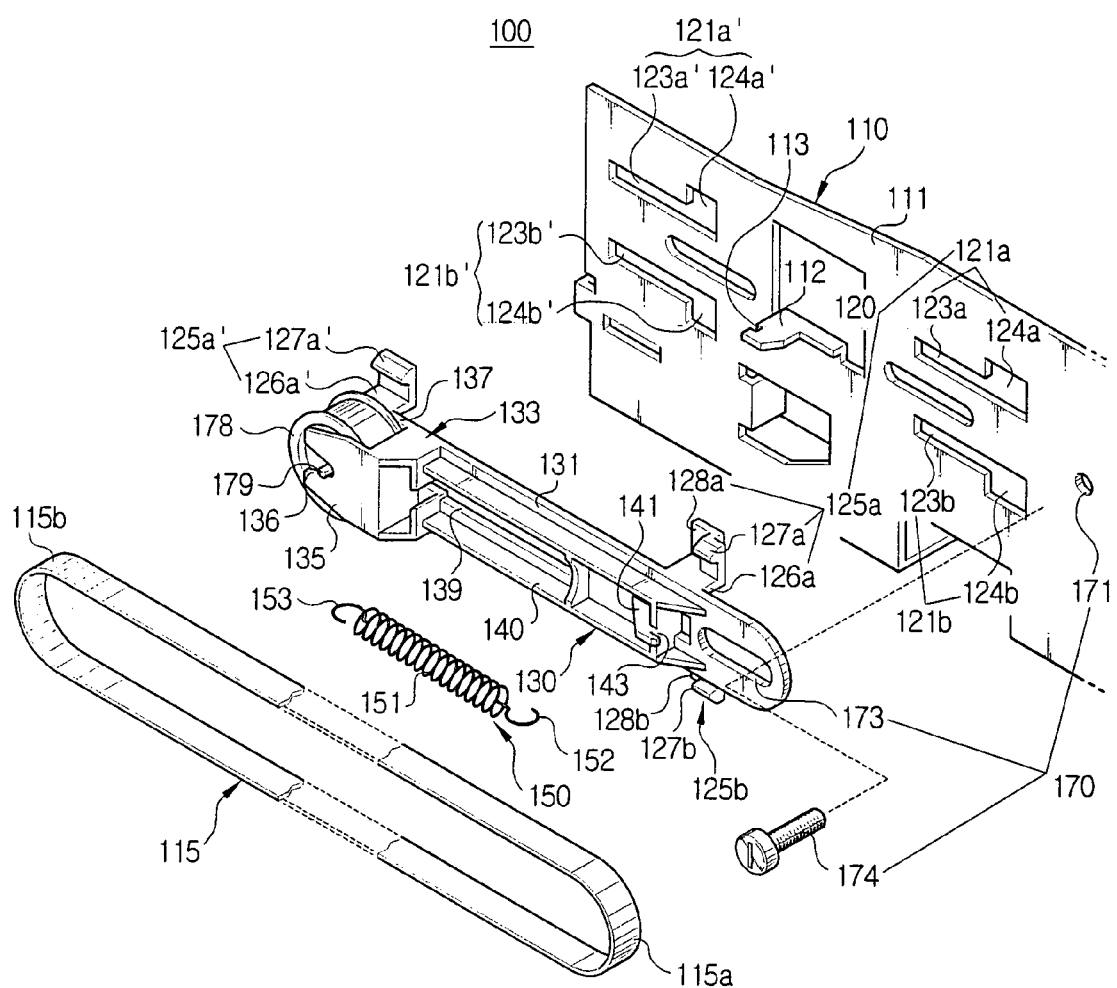
FIG. 5 is an exploded view of a pulley fixing apparatus of office machine in accordance with an embodiment of the present invention.

Referring now to FIG. 5, there is illustrated a pulley fixing apparatus 100 of an image forming apparatus, to fix a driven pulley to engage with one side of a power-transmitting belt, in accordance with an embodiment of the present invention.

The image forming apparatus, for example an inkjet printer, to which the pulley fixing apparatus 100 of the present invention is applied, has a carrier transfer belt 115 transmitting a driving force to a power-transmitting saw tooth (not shown) formed at a carrier (not shown) mounting a print head (not shown) having a nozzle for jetting ink, a carrier driving motor (not shown) having a driving pulley (not shown) disposed at one side, i.e. a first side 115a of the carrier transfer belt 115, a driven pulley 178 disposed at the other side, i.e., a second side 115b of the carrier transfer belt 115, and a bracket 111 forming a portion of a frame 110 to rotatably install the driven pulley 178 and the driving pulley of the carrier driving motor through the pulley fixing apparatus 100 and a separate fixing apparatus (not shown), respectively.

The pulley fixing apparatus 100 has a pulley fixing part 130 rotatably fixing the driven pulley 178 on the bracket 111 of the frame 110, a sliding part 120 movably supporting the pulley fixing part 130 at the bracket 111, and an automatic tension adjusting part 150 disposed between the pulley fixing part 130 and the bracket 111 to elastically urge the pulley fixing part 130 in a direction such that the driven pulley 178 imparts a predetermined tension to the power transmitting belt 123.

The pulley fixing part 130 has an elongated plate member 131 with a driven pulley support 133 supporting the driven pulley 178 in a manner that a circumference surface of the driven pulley 178 coming in contact with the second side 115b of the carrier transfer belt 115 is exposed, thereby allowing the carrier transfer belt 115 to be freely installed on the driven pulley 178, and removed from the driven pulley 178.

To install the driven pulley 178, the driven pulley support 133, which is integrated with one end of the elongated plate member 131, has a flattened U-shaped bracket structure with a closed support hole (not shown) at one end 137 thereof to support one end of a center shaft 179 of the driven pulley 178, and an opened support hole 136 at the other end 135 thereof to support the other end of the center shaft 179 of the driven pulley 178.

The sliding part 120 has first, second, third, and fourth slide protrusions 125a, 125b, 125a', and 125b' (not shown) formed respectively at upper and lower portions in a rear surface of the other end of the elongated plate member 131 and upper and lower portions in a rear surface of the one end 137 of the driven pulley support 133, and first, second, third, and fourth protrusion guide holes 121a, 121b, 121a', and 121b' formed longitudinally, i.e., in a direction which the pulley fixing part 130 is moved, at positions of the bracket 111 corresponding to the first, second, third, and fourth slide protrusions 125a, 125b, 125a', and 125b' to receive and guide the first, second, third, and fourth slide protrusions 125a, 125b, 125a', and 125b'.

Each of the first, second, third, and fourth slide protrusions 125a, 125b, 125a', and 125b' has an L-shaped projection with a sliding end 127a, 127b, 127a', and 127b' respectively, positioned parallel with a front or rear surface of the bracket 111, and a support portion 126a, 126b, 126a', and 126b' positioned perpendicular to the front surface of the bracket 111.

Figure 6:
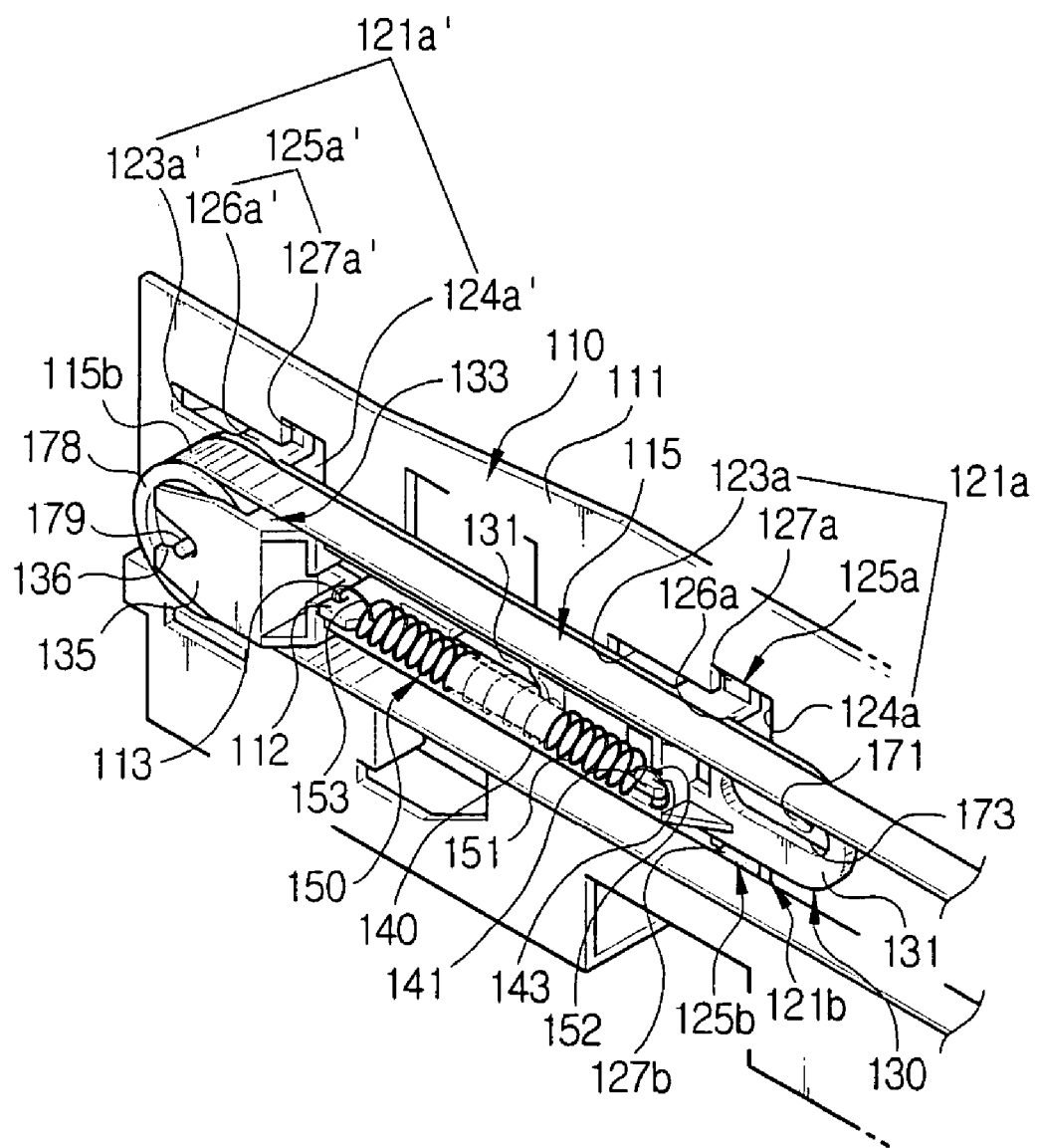
FIG. 6 is a perspective view of the pulley fixing apparatus of FIG. 5.

According to one aspect, the first and second slide protrusions 125a and 125b, which are positioned at the upper and lower portions in the rear surface of the other end of the elongated plate member 131, respectively include first and second stoppers 128a and 128b to prevent the sliding ends 127a and 127b from completely coming out from wide hole portions 124a and 124b of corresponding first and second protrusion guide holes 121a and 121b to be described later, thereby allowing the pulley fixing part 130 to be temporarily stopped at a carrier transfer belt-assembling position (FIG. 6, FIG. 9D, and FIG. 9E) when the carrier transfer belt 115 is installed, as will be described later. Each of the first and second stoppers 128a and 128b has an L-shaped recess formed with the sliding end 127a and 127b, respectively in a body to engage with a sidewall of the wide hole portion 124a and 124b, respectively, of the first or second protrusion guide holes 121a or 121b, and a rear surface of the bracket 111 in the vicinity of the sidewall of the wide hole portion 124a and 124b respectively.

Each of the first, second, third and fourth protrusion guide holes 121a, 121b, 121a', and 121b' has an L-shaped hole with a wide hole portion 124a, 124b, 124a', and 124b' receiving the sliding end 124a, 124b, 124a', and 124b', respectively, of the first, second, third, and fourth slide protrusion 125a, 125b, 125a', and 125b', respectively and a flattened I-shaped hole portion (or narrow hole portion) 123a, 123b, 123a', and 123b' receiving and guiding the support portion 126a, 126b, 126a', and 126b', respectively of the first, second, third or fourth slide protrusions 125a, 125b, 125a', and 125b'.

Thus, the pulley fixing part 130 is movably supported on the bracket 111 through the engagement between the first, second, third, and fourth slide protrusions 125a, 125b, 125a', and 125b' and the first, second, third, and fourth protrusion guide holes 121a, 121b, 121a' and 121b'.

The respective protrusion guide holes 121a, 121b, 121a' and 121b' have a length such that the pulley fixing part 130 is movable between a spring assembling position (FIG. 9B and FIG. 9C) at which the driven pulley 178 is positioned beyond a length range of the carrier transfer belt 115, and an initial pulley fixing part-assembling position (FIG. 9A) at which the driven pulley 178 is positioned within the length range of the carrier transfer belt 115.

Figure 9A:
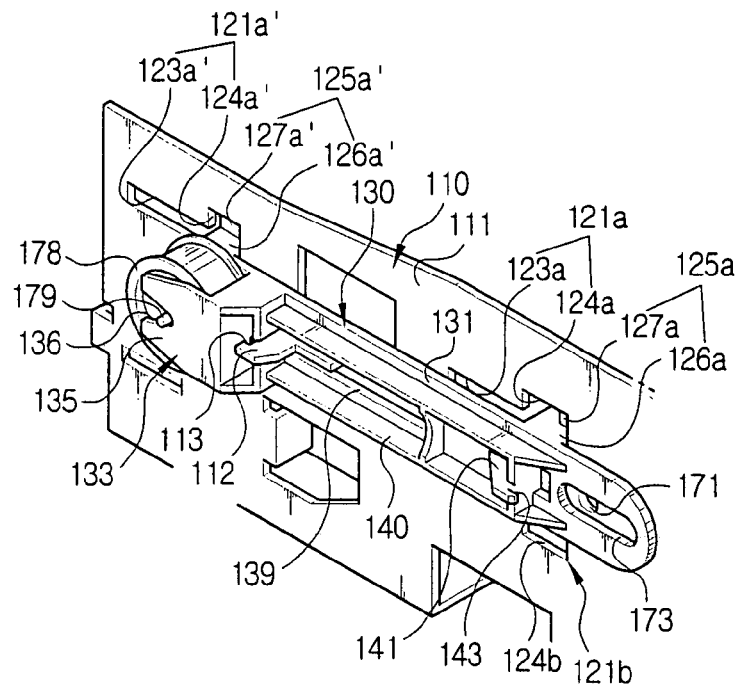
FIGS. 9A through 9F are perspective views illustrating the operation of the pulley fixing apparatus of FIG. 5.

Accordingly, to install the pulley fixing part 130, an elastic pulling spring 151 to be described later, and the carrier transfer belt 115, the pulley fixing part 130 is moved in the carrier transfer belt-assembling position (FIG. 9D and FIG. 9E) and a tension adjusting position (FIG. 9F), as well as the spring assembling position (FIG. 9B and FIG. 9C) and the initial pulley fixing part-assembling position (FIG. 9A). The carrier transfer belt-assembling position is located between the length range of the carrier transfer belt 115 and the initial pulley fixing partassembling position (FIG. 9A). The tension adjusting position is located between the spring assembling position (FIG. 9B and FIG. 9C) and the initial pulley fixing part-assembling position (FIG. 9A), within the length range of the carrier transfer belt 115.

To bias the pulley fixing part 130 in the direction in which the driven pulley 178 imparts the predetermined tension to the carrier transfer belt 115, the automatic tension adjusting part 150 is provided with the elastic pulling spring 151. The elastic pulling spring 151 is received in a spring receiving portion 140, and has one end fixed at the pulley fixing part 130 by a first fixing portion 152, 141 and the other end fixed at the bracket 111 by a second fixing portion 153, 112. The elastic pulling spring 151 has an elastic force set to impart the predetermined tension to the carrier transfer belt 115.

The first fixing portion 152, 141 has a first hook 152 located at the one end of the elastic pulling spring 151, and a first fixing protrusion 141, which is located at the other end of the elongated plate member 131 of the pulley fixing part 130, and has a first fixing groove 143 to receive and fix the first hook 152. The second fixing portion 153, 112 has a second hook 153 located at the other end of the elastic pulling spring 151, and a second fixing protrusion 112 located at the bracket 111 to protrude through a long penetrated hole 139 positioned at the elongated plate member 131 of the pulley fixing part 130. The second fixing protrusion has a second fixing groove 113 to receive and fix the second hook 153.

Figure 9B:
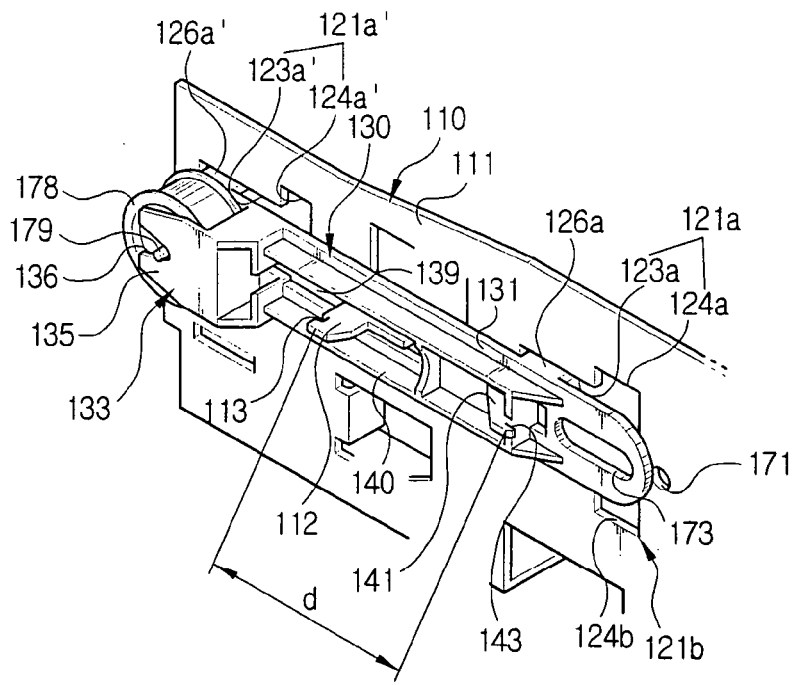
Figure 9C:
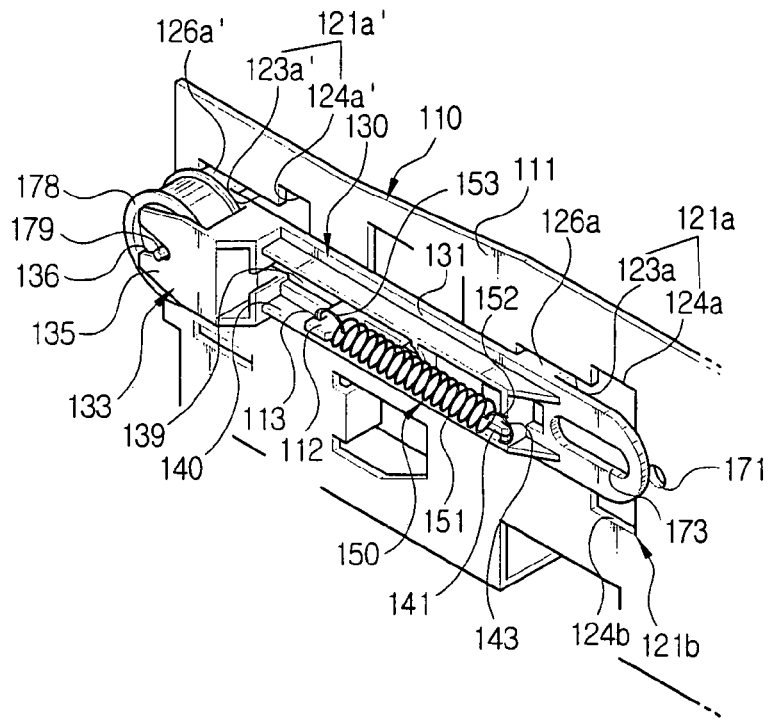

As shown in FIGS. 9B and 9C, the elastic pulling spring 151 is fixed to the pulley fixing part 130 after the pulley fixing part 130 is moved to the spring assembling position, where a distance d between the first fixing protrusion 141 and the second fixing protrusion 112 is equal to a free length of the elastic pulling spring 151.

Figure 9D:
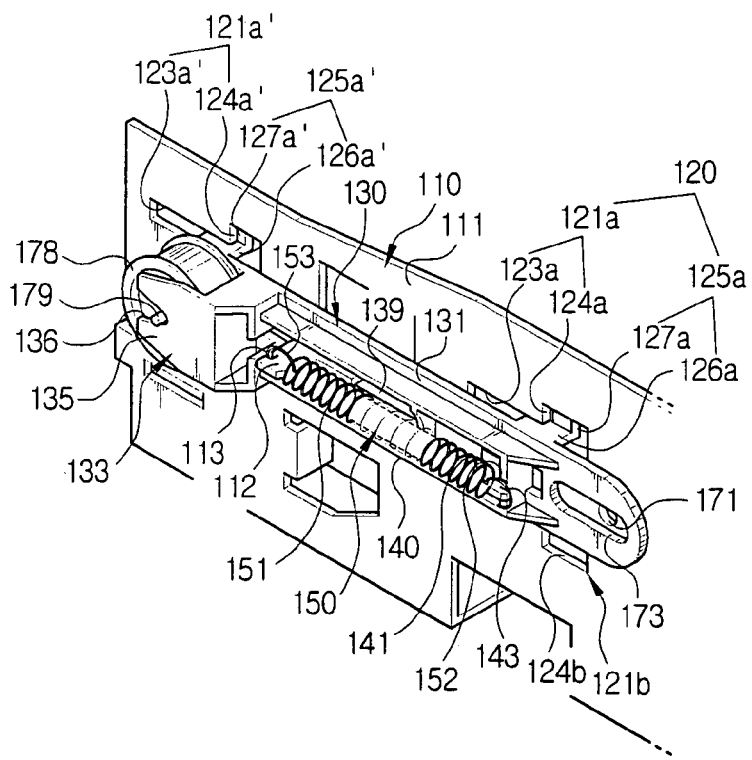
Figure 9E:
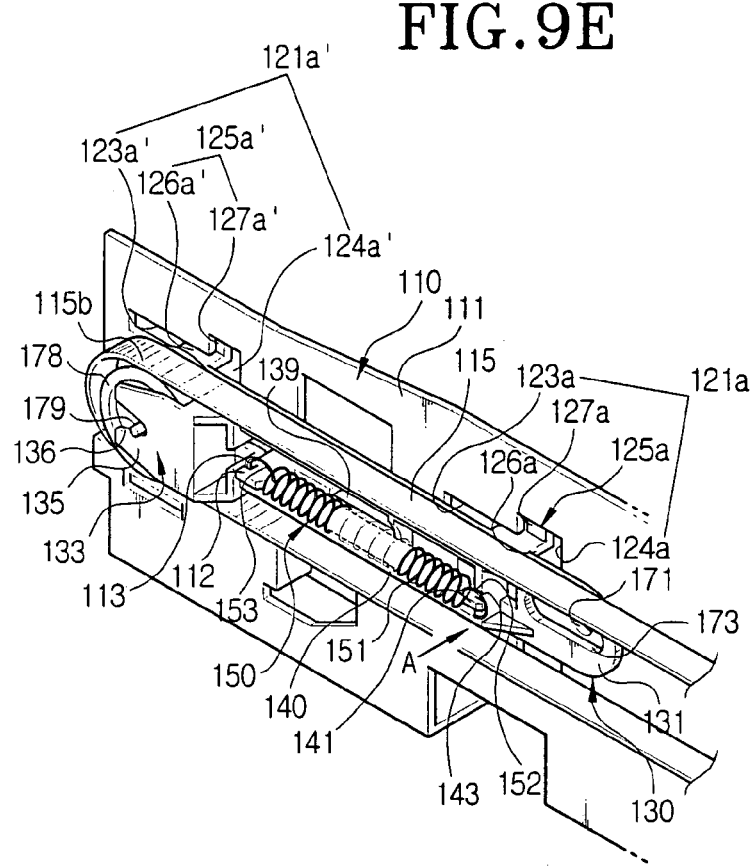
Figure 9F:
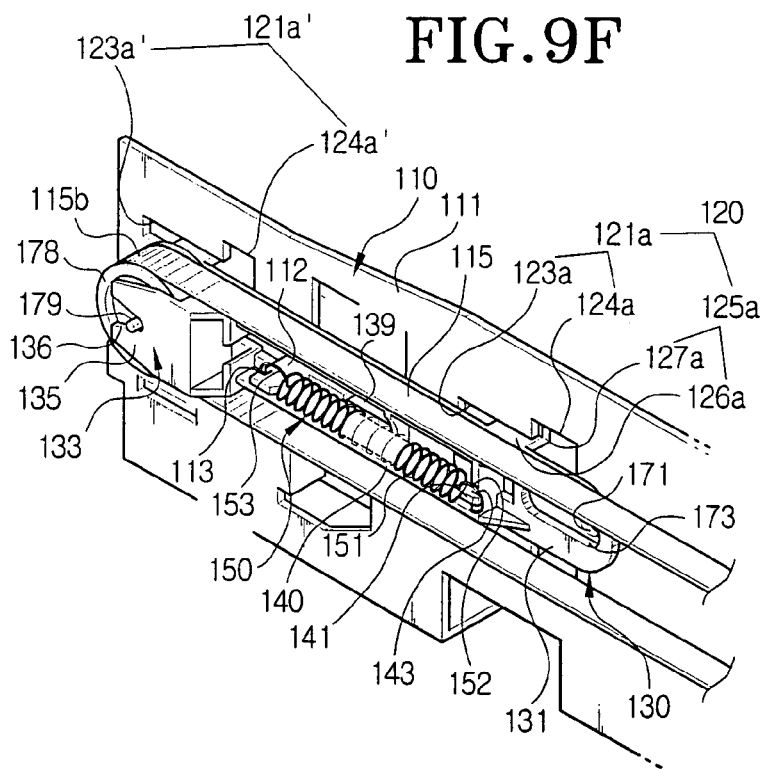

As shown in FIGS. 9D and 9E, when the carrier transfer belt 115 is mounted on the driven pulley 178, the elastic pulling spring 151 is pulled into the carrier transfer belt-assembling position, where the first and second stoppers 128a and 128b, are engaged with the wide hole portions 124a, and 124b, to allow positioning of the carrier transfer belt 115 over a circumference surface of the driven pulley 178. Also, as shown in FIG. 9F, when the stoppers 128a, and 128b are released from wide hole portions 124a, and 124b the pulley fixing part 130 is pushed in an arrow direction A (see FIG. 9E) after the carrier transfer belt 115 is positioned over the circumference surface of the driven pulley 178, the elastic pulling spring 151 pulls the pulley fixing part 130 into the tension adjusting position, at which the driven pulley imparts the predetermined tension to the carrier transfer belt 115.

The automatic tension adjusting part 150 further includes an anti-release portion to prevent the first, second, third, and fourth slide protrusions 125a, 125b, 125a', and 125b' of the pulley fixing part 130 from being released from the first, second, third, and fourth protrusion guide holes 121a, 121b, 121a' and 121b' of the bracket 111 when the pulley fixing part 130, with the driven pulley 178 fixed thereto, is moved into the initial pulley fixing part-assembling position by an abnormal external force, such as an external impact,.

According to one aspect, such an anti-release portion is constructed as the second fixing portion 153, 112, so that a separate fixing part, such as a screw, is not required. Accordingly, the second hook 153 of the second fixing portion 153, 112 has a width larger than that of the penetrated hole 139, to prevent being released.

Alternatively, according to another aspect, after the tension of the carrier transfer belt 115 installed on the driven pulley 178 is adjusted by the automatic tension adjusting part 150 or forcibly by user, the pulley fixing apparatus 100 is immovably locked to the pulley fixing part 130, to maintain the tension of the carrier transfer belt 115 in the adjusted state.

For this, the pulley fixing apparatus 100 has a locking part 170. The locking part 170 has an elongated adjusting-guide hole 173 located on the pulley fixing part 130 and oriented in the moving direction thereof, a threaded hole 171 located on formed at the bracket 111 in a range corresponding to the elongated adjusting-guide hole 173, and a locking screw 174 that engages the threaded hole 171 through the elongated adjusting-guide hole 173.

But after being locked by the locking part 170, the pulley fixing part 130 may be pushed by a driving force of the carrier transfer belt 115 to change position during movement of the carrier. Such a position change of the pulley fixing part 130 has a negative effect on the printing position arrangement of the print head, since the pulley fixing part 130 is not automatically returned by the elastic pulling spring 151, but rather maintained in the changed position due to the locking force of the locking part 170.

Figure 7:
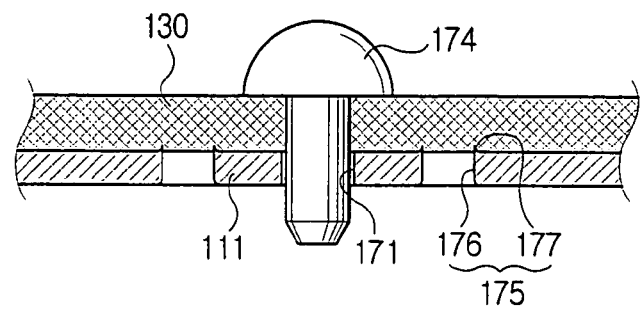
FIG. 7 is a cross-sectional view illustrating an anti-push portion of a locking part of the pulley fixing apparatus of FIG. 5.
Figure 8A:
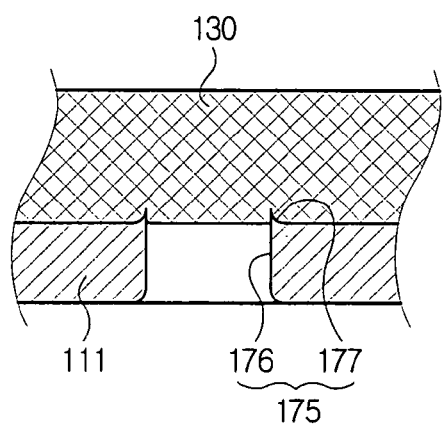
FIGS. 8A and 8B are cross-sectional views illustrating examples of a projection of the anti-push portion of FIG. 7.
Figure 8B:
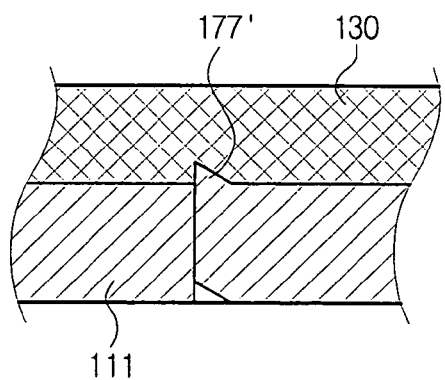

To overcome this, as shown in FIGS. 7 and 8A, according to one aspect the locking part additionally has an anti-push portion 175 to prevent the pulley fixing part 130 from being pushed by the driving force of the carrier transfer belt 115.

The anti-push portion 175 has at least one projection 177 located on the bracket 111 in the vicinity of the screwed hole 171 of the bracket 111, without being a separate part. The projection 177 is compressed into the pulley fixing part 130 when the locking screw 174 of the locking part 170 is locked in the threaded hole 171. According to one aspect, the projection 177 is a burr created to protrude toward the pulley fixing part 130 around a hole 176. According to one aspect, the hole 176 is created by press machining.

Alternatively, according to another aspect the projection is a protrusion portion 177' formed to protrude toward the pulley fixing part 130 by press machining.

As described above, the pulley fixing apparatus 100 of the present invention has a relatively simplified structure to easily mount and dismount the pulley fixing part 130 and the carrier transfer belt 115 on the bracket 111 and the driven pulley 179, respectively and easily control the tension of the carrier transfer belt 115.

The pulley fixing apparatus 100 of the present invention has thus far been explained and illustrated as applied to the driven pulley 178 connected with the carrier transfer belt 115 for the print head of the inkjet printer, but the present invention is not limited to this. For example, the present invention can be applied to a power-transmitting pulley (not shown) connected with a power-transmitting belt (not shown) for transmitting a driving force of a driving pulley (not shown) of a feed roller driving motor (not shown) to a feed roller (not shown).

The operation of the pulley fixing apparatus 100 of the image forming apparatus will now be explained with reference to FIG. 5 through FIGS. 9A-E.

First, when the driven pulley 178 and the carrier transfer belt 115 are to be mounted, the driven pulley 178 is installed in the driven pulley support 133, as shown in FIG. 9A.

And then, after alignment with the wide hole portions 124a, 124b, 124a', and 124b' of the first, second, third, and fourth protrusion guide holes 121a, 121b, 121a', and 121b', the first, second, third, and fourth slide protrusions 125a, 125b, 125a', and 125b' are inserted into the wide hole portions 124a, 124b, 124a', and 124b'. As a result, the pulley fixing part 130 is positioned at the initial pulley fixing part-assembling position.

Thereafter, as shown in FIGS. 9B and 9C, the pulley fixing part 130 is moved to the spring assembling position, at which the distance d between the first fixing protrusion 141 and the second fixing protrusion 112 is equal to the free length of the elastic pulling spring 151. Then, the elastic pulling spring 151 is installed in the spring receiving portion 140 such that the first hook 152 is secured in the first fixing groove 143 of the first fixing protrusion 141 of the pulley fixing part 130, and the second hook 153 is secured in the second fixing groove 113 of the second fixing protrusion 112 of the bracket 111.

And then, as shown in FIG. 9D, the pulley fixing part 130 is pulled to the carrier transfer belt-assembling position, at which the first and second stoppers 128a, and 128b (see FIG. 5) are engaged with the wide hole portions 124a and 124b, to prevent the sliding end 127a and 127b of the first and second slide protrusions 125a and 125b from disengaging from the wide hole portions 124a and 124b of the corresponding first and second protrusion guide holes 121a and 121b, due to the elastic force of the elastic pulling spring 151. At this time, the pulley fixing part 130 is maintained in a state slightly raised as much as a height of the first and second stoppers 128a and 128b.

Subsequently, as shown in FIG. 9E, the second side 115b of the carrier transfer belt 115 is installed over the circumference surface of the driven pulley 178. At this time, the driven pulley 178 is positioned in the length range of the carrier transfer belt 115, so that the second side 115b of the carrier transfer belt 115 does not come in contact with the circumference surface of the driven pulley 178.

When the pulley fixing part 130 is pushed in an arrow direction A, the pulley fixing part 130, which is maintained in the state slightly raised as much as the height of the first and second stoppers 128a and 128b, is pushed down to release the first and second stoppers 128a and 128b from the wide hole portions 124a and 124b. As a result, the elastic pulling spring 151 pulls the other end of the pulley fixing part 130, and thereby the driven pulley 178 of the pulley fixing part 130 is pulled by the elastic pulling spring 151 to impart the predetermined tension to the carrier transfer belt 115, as shown in FIG. 9F.

In this state, the second fixing portion 112, 153 forming the anti-release portion, which prevents the pulley fixing part 130 from being released from the bracket 111, even when the pulley fixing part 130 is moved into the initial pulley fixing part-assembling position by an abnormal external force such as an external impact.

To fix the pulley fixing part 130 in a state which the driven pulley 178 imparts the predetermined tension to the carrier transfer belt 115 by the elastic pulling spring 151 as described above, or by user compulsion, the locking screw 174 of the locking part 170 is locked in the threaded hole 171 through the elongated adjusting-guide hole 173. At this time, as shown in FIG. 7, the projection 177 formed in the vicinity of the threaded hole 171 of the bracket 111t is compressed into the pulley fixing part 130. Thereby, the problem that the fixed position of the pulley fixing part 130 is changed by the driving force of the carrier transfer belt 115 during moving of the carrier is prevented.

Thereafter, when the driven pulley 178 and the carrier transfer belt 115 are dismounted from the bracket 111 to be exchanged, the operation of the pulley fixing apparatus 100 is carried out in a reverse order to what is explained above.

As is apparent from the foregoing description, it can be appreciated that the pulley fixing apparatus can easily mount and dismount the pulley fixing part and the carrier transfer belt respectively on the bracket and the driven pulley, and easily control the tension of the carrier transfer belt with a simplified structure and assembly.

Also, the pulley fixing apparatus can reduce manufacturing cost and assembling time by decreasing the number of parts.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A pulley fixing apparatus for an image forming apparatus including a frame, a driving motor, and a power-transmitting belt driven by the driving motor and a driving pulley, the pulley fixing apparatus comprising:
   a pulley fixing part rotatably fixing a driven pulley on the frame;
   a sliding part movably supporting the pulley fixing part on the frame; and
   an automatic tension adjusting part including an elastic pulling spring disposed between the pulley fixing part and the frame to elastically bias the pulley fixing part in a first direction and impart a predetermined tension to the power-transmitting belt, wherein:
   the pulley fixing part comprises a first fixing portion;
   the frame comprises a second fixing portion arranged between the first fixing portion and the driven pulley; and
   the elastic pulling spring has one end fixed at the first fixing portion and another end fixed at the second fixing portion to push the driven pulley outwardly from the second fixing portion of the frames,
   wherein:
   the sliding part comprises a slide protrusion positioned at the pulley fixing part; and
   the frame has an L-shaped protrusion guide hole positioned to support, receive and guide a projection of the slide protrusion.

2. The apparatus according to claim 1, wherein the pulley fixing part comprises:
   a plate member having a driven pulley support supporting the driven pulley and exposing a circumference surface of the driven pulley that contacts the power-transmitting belt to ease installation and removal of the power-transmitting belt.

3. The apparatus according to claim 1, wherein:
   the sliding part comprises first, second, third, and fourth slide protrusions positioned at the pulley fixing part; and
   the frame has corresponding first, second, third, and fourth protrusion guide holes positioned to receive and guide the respective slide protrusions.

4. The apparatus according to claim 1, wherein:
   the protrusion guide hole has a length such that when the power-transmitting belt is not installed, the pulley fixing part is movable between a spring assembling position and an initial pulley fixing part-assembling position.

5. The apparatus according to claim 4, wherein:
   a length range of the power-transmitting belt is defined along the first direction from the driving pulley;
   the spring assembling position is beyond the length range of the power-transmitting belt; and
   the initial pulley fixing part-assembling position is within the length range of the power transmitting belt.

6. The apparatus according to claim 5, wherein:
   a power-transmitting belt assembling position of the pulley fixing part is located between the length of range of the power-transmitting belt and the initial pulley fixing part-assembling position.

7. The apparatus according to claim 5, wherein:
   a tension adjusting position of the pulley fixing part is located between the spring assembling position and the initial pulley fixing part-assembling position, within the length range of the power-transmitting belt.

8. The apparatus according to claim 1, wherein:
the protection of the slide protrusion comprises a projection having a support portion and a sliding end; and
the protrusion guide hole comprises a first lateral hole portion receiving the sliding end, and a second lateral hole portion receiving and guiding the support portion, wherein the second lateral hole portion is narrower than the first lateral hole portion.

9. The apparatus according to claim 8, wherein:
the support portion protrudes approximately perpendicularly from the pulley fixing part; and
the sliding end protrudes approximately perpendicularly from the support portion.

10. The apparatus according to claim 8, wherein the slide protrusion further comprises:
a stopper preventing the sliding end from freely passing through the first lateral hole portion after the sliding part is movably supported on the frame.

11. The apparatus according to claim 10, wherein the stopper comprises:
an L-shaped recess positioned at the sliding end to engage a sidewall of the first lateral hole portion and a rear surface of the frame in a vicinity of the sidewall of the first lateral hole portion.

12. The apparatus according to claim 1, wherein:
the first fixing portion comprises a first hook positioned at the one end of the elastic spring, and a first fixing protrusion to fix the first hook positioned at the pulley fixing part; and
the second fixing portion comprises a second hook positioned at the other end of the elastic spring, and a second fixing protrusion to fix the second hook positioned at the frame to protrude through a penetrated hole positioned at the pulley fixing part.

13. A pulley fixing apparatus for an image forming apparatus including a frame, a driving motor, and a power-transmitting belt driven by the driving motor and a driving pulley, the pulley fixing apparatus comprising:
a pulley fixing part rotatably fixing a driven pulley on the frame;
a sliding part movably supporting the pulley fixing part on the frame; and
an automatic tension adjusting part including an elastic pulling spring disposed between the pulley fixing part and the frame to elastically bias the pulley fixing part in a first direction and impart a predetermined tension to the power-transmitting belt and an anti-release portion to prevent the pulley fixing part from being released from the frame by an external force of predetermined magnitude, wherein the anti-release portion comprises a second hook having a width that is greater than a width of the penetrated hole, and wherein:
the pulley fixing part comprises a first fixing portion;
the frame comprises a second fixing portion arranged between the first fixing portion and the driven pulley; and
the elastic pulling spring has one end fixed at the first fixing portion and another end fixed at the second fixing portion to push the driven pulley outwardly from the second fixing portion of the frame.

14. An image forming apparatus having a pulley fixing apparatus, wherein the pulley fixing apparatus includes a frame, a driving motor, and a power-transmitting belt driven by the driving motor and a driving pulley, the image forming apparatus comprising:

the pulley fixing apparatus, wherein the pulley fixing apparatus further comprises:
a pulley fixing part rotatably fixing a driven pulley on the frame;
a sliding part movably supporting the pulley fixing part on the frame; and
an automatic tension adjusting part including an elastic pulling spring disposed between the pulley fixing part and the frame to elastically bias the pulley fixing part in a first direction and impart a predetermined tension to the power-transmitting belt wherein said driven pulley is pushed from an inside of said belt when the spring is in tension, wherein:
the pulley fixing part comprises a first fixing portion;
the frame comprises a second fixing portion arranged to push the driven pulley outwardly from the first fixing portion of the pulley fixing part; and
the automatic tension adjusting part comprises an elastic spring having one end fixed at the first fixing portion and another end fixed at the second fixing portion,
wherein the image forming apparatus is an inkjet printer, and wherein:
the power-transmitting belt comprises a power-transmitting belt transmitting a driving force to a feed roller in the inkjet printer;
the driving motor comprises a feed roller driving motor in the inkjet printer; and
the driven pulley comprises a power-transmitting pulley, transmitting the driving force of the feed roller driving motor through the power-transmitting belt.

15. An image forming apparatus having a pulley fixing apparatus, wherein the pulley fixing apparatus includes a frame, a driving motor, and a power-transmitting belt driven by the driving motor and a driving pulley, the image forming apparatus comprising:
the pulley fixing apparatus, wherein the pulley fixing apparatus further comprises:
a pulley fixing part rotatably fixing a driven pulley on the frame;
a sliding part movably supporting the pulley fixing part on the frame; and
an automatic tension adjusting part including an elastic pulling spring disposed between the pulley fixing part and the frame to elastically bias the pulley fixing part in a first direction and impart a predetermined tension to the power-transmitting belt wherein said driven pulley is pushed from an inside of said belt when the spring is in tension, wherein:
the pulley fixing part comprises a first fixing portion;
the frame comprises a second fixing portion arranged to push the driven pulley outwardly from the first fixing portion of the pulley fixing part; and
the automatic tension adjusting part comprises an elastic spring having one end fixed at the first fixing portion and another end fixed at the second fixing portion,
wherein the image forming apparatus is an inkjet printer, and wherein:
the power-transmitting belt comprises a carrier belt transmitting a driving force to a print head of the inkjet printer;
the driving motor comprises a carrier driving motor of the inkjet printer; and
the driven pulley transmits the driving force of the carrier driving motor through the carrier transfer belt.

16. A pulley fixing apparatus for an image forming apparatus including a frame, a driving motor, and a power-transmitting belt driven by the driving motor and a driving pulley, the pulley fixing apparatus comprising:
- a pulley fixing part rotatably fixing a driven pulley on the frame;
- a sliding part movably supporting the pulley fixing part on the frame;
- an automatic tension adjusting part disposed between the pulley fixing part and the frame to elastically bias the pulley fixing part in a first direction and impart a predetermined tension to the power-transmitting belt; and
- a locking part to lock the pulley fixing part after the tension of the power-transmitting belt installed on the driven pulley is adjusted, wherein:
- the pulley fixing part comprises a first fixing portion;
- the frame comprises a second fixing portion arranged between the first fixing portion and the driven pulley; and
- the automatic tension adjusting part comprises an elastic spring having one end fixed at the first fixing portion and another end fixed at the second fixing portion to push the driven pulley outwardly from the second fixing portion of the frame,
- wherein:
- the sliding part comprises a slide protrusion positioned at the pulley fixing part; and
- the frame has an L-shaped protrusion guide hole positioned to support, receive and guide a projection of the slide protrusion.

17. The apparatus according to claim 16, wherein the locking part comprises:
- an elongated adjusting-guide with a long axis oriented at the pulley fixing part along the direction in which the pulley fixing part is elastically urged;
- a threaded hole positioned at the frame to correspond to the elongated adjusting-guide hole; and
- a locking screw engaging the threaded hole through the elongated adjusting-guide hole.

18. The apparatus according to claim 17, wherein the locking part further comprises:
- an anti-push portion to prevent the pulley fixing part from being pushed by the driving force of the power-transmitting belt.

19. The apparatus according to claim 18, wherein the anti-push portion comprises:
- at least one projection positioned at the frame in the vicinity of the threaded hole.

20. The apparatus according to claim 19, wherein the projection comprises:
- a protrusion portion positioned by press machining to protrude toward the pulley fixing part.

21. The apparatus according to claim 20, wherein the projection comprises:
- a burr positioned around a hole created by press machining, to protrude toward the pulley fixing part.

22. A subassembly of an image forming apparatus including a frame, a driving motor, and a power-transmitting belt driven by the driving motor and a driving pulley, the subassembly comprising:
- a pulley fixing part slidably fixing a driven pulley on the frame that imparts a tension to the power-transmitting belt by the driven pulley pushing from an inside of the belt when a spring disposed between the pulley fixing part and the frame is in tension, wherein:
- the pulley fixing part comprises a first fixing portion;
- the frame comprises a second fixing portion arranged between the first fixing portion and the driven pulley; and
- the spring has one end fixed at the first fixing portion and another end fixed at the second fixing portion to push the driven pulley outwardly from the second fixing portion of the frame,
- wherein:
- a sliding part comprises a slide protrusion positioned at the pulley fixing part; and
- the frame has an L-shaped protrusion guide hole positioned to support, receive and guide a projection of the slide protrusion.

23. A pulley fixing apparatus for an image forming apparatus including a frame, a driving motor, a power-transmitting belt driven by the driving motor and a driving pulley, the pulley fixing apparatus comprising:
- an assembly positioned inside the belt and comprising:
  - a pulley fixing part rotatably fixing a driven pulley on the frame;
  - a sliding part movably supporting the pulley fixing part on the frame; and
  - an automatic tension adjusting part disposed between the pulley fixing part and the frame to elastically bias the pulley fixing part in a first direction and impart a predetermined tension to the power-transmitting belt when a spring disposed between the pulley fixing part and the frame is in tension, wherein:
- the pulley fixing part comprises a first fixing portion;
- the frame comprises a second fixing portion arranged between the first fixing portion and the driven pulley; and
- the spring has one end fixed at the first fixing portion and another end fixed at the second fixing portion to push the driven pulley outwardly from the second fixing portion of the frame,
- wherein:
- the sliding part comprises a slide protrusion positioned at the pulley fixing part; and
- the frame has an L-shaped protrusion guide hole positioned to support, receive and guide a projection of the slide protrusion.

* * * * *

UNITED STATES PATENT AND TRADEMARK OFFICE
CERTIFICATE OF CORRECTION

PATENT NO. : 7,247,109 B2 Page 1 of 1
APPLICATION NO. : 10/670262
DATED : July 24, 2007
INVENTOR(S) : Karp-sik Youn It is certified that error appears in the above-identified patent and that said Letters Patent is hereby corrected as shown below:

Column 10, Line 25, Claim 1, change "frames," to --frame,--.

Column 11, Line 4, Claim 8, change "protection" to --projection--.

Signed and Sealed this

Fourth Day of December, 2007

JON W. DUDAS
*Director of the United States Patent and Trademark Office*